> United States Patent [19]
> Gibbs et al.

[11] 3,965,032
[45] June 22, 1976

[54] COLLOIDALLY STABLE DISPERSIONS

[75] Inventors: Dale S. Gibbs; Robert D. Vandell; Ritchie A. Wessling, all of Midland, Mich.

[73] Assignee: The Dow Chemical Company, Midland, Mich.

[22] Filed: Apr. 16, 1973

[21] Appl. No.: 351,713

[52] U.S. Cl. .................. 252/306; 252/309; 252/311; 252/312; 260/29.6 RW; 260/79.3 MU; 526/303; 526/304; 526/319; 526/329; 526/342; 526/348
[51] Int. Cl.² .................. B01J 13/00; C08F 15/02
[58] Field of Search ............... 260/87.5 R, 79.3 MU, 260/78.5, 85.5 R, 85.7, 86.1, 87.5 R, 881, 884, 885, 29.6 RW; 252/309, 312, 306

[56] References Cited
UNITED STATES PATENTS

| | | | |
|---|---|---|---|
| 2,914,499 | 11/1959 | Sheetz | 260/29.6 |
| 3,296,176 | 1/1967 | Fantl | 260/29.6 |
| 3,565,833 | 2/1971 | Battaerd | 260/2.1 |
| 3,780,092 | 12/1973 | Samour | 260/482 R |
| 3,813,345 | 5/1974 | Urton | 252/312 |

*Primary Examiner*—Christopher A. Henderson, Jr.
*Attorney, Agent, or Firm*—Ronald G. Brookens

[57] ABSTRACT

This invention is directed to dispersions containing stabilizing amounts of certain substantially linear interpolymeric interfacially spreading polyelectrolytes composed of a mixture of nonionic hydrophobic units and ionic hydrophilic units where the nonionic units are randomly distributed in the backbone of the polyelectrolyte and where the polyelectrolyte is adsorbed at the surface of the disperse phase of the dispersion in a substantially flat configuration. The polyelectrolytes are further characterized by having an adsorption constant equal to or greater than 1 at the point where the surface of the disperse phase is saturated with the polyelectrolyte, the absorption constant being determined as the amount of polyelectrolyte in the disperse phase divided by the amount of polyelectrolyte in the continuous phase. These stabilized dispersions are particularly useful as coating compositions and for use in the preparation of microspheres and seed latexes.

11 Claims, No Drawings

COLLOIDALLY STABLE DISPERSIONS

BACKGROUND OF THE INVENTION

The requirement for a surfactant where colloidal suspension or emulsions are employed, for example in the preparation of latexes, microspheres, or in suspending agents used as antipollutants, is well recognized in the art. Further, it is desirable to utilize a surfactant having the highest adsorption efficiency attainable. One example is the use of such material in a polymer latex used to obtain coatings which are impermeable to the passage of moisture and gases such as oxygen. In such systems, excess surfactant in the water phase of such latex, interferes with the impermeability characteristics of the latex by producing exudates at the coating surface. Further, the surfactant frequently interferes with adhesion of the latex to the substrate being protected or with cohesion of the coating to itself (heat seal). Still further, coatings containing excess surfactants have a high level of water leachables which oftentimes precludes the use of such materials in applications such as food wraps.

A further requirement for a successful surfactant for use in colloidal suspensions or emulsions is the ability of such material to remain on the surface of the disperse phase of the colloidal suspension or emulsion in the presence of other formulating agents or when the colloidal suspension or emulsion is diluted or concentrated. The structure of the surfactant is also important, i.e., whether such material lies flat along the disperse phase or is randomly attached to the surface of such disperse phase with a portion of its molecular structure extending into the continuous phase of the colloidal suspension or emulsion. It is the molecular structure of the surfactant and its method of attachment to the disperse phase of the colloidal suspension or emulsion which will determine the amount of surfactant required as well as the colloidal stability, viscosity and other rheological properties of the colloidal suspension or emulsion.

Prior known surfactant materials include the conventional nonpolymerizable water-soluble alkali soaps as described, by way of example, in U.S. Pat. No. 2,655,496. In general, these materials are characterized by relatively low energies of desorption and can easily be displaced or desorbed from a disperse phase in the presence of other materials having higher energies of adsorption or by dilution of the suspension or emulsion.

Other types of prior known surfactants having somewhat greater resistance to desorption are the surface active polymeric or polymerizable materials used for the preparation of latexes as disclosed, for example, in U.S. Pat. Nos. 3,177,172; 3,399,159 and 3,617,638; as well as the publication by Migranyan et al. (Vysokomolkulyarnye Soedineniya, Seriya B, 11, No. 8, 620–623, 1969). Basically, such prior art relates to the combination of monomeric materials formed into a polymer with an ionically substituted backbone to which is attached relatively long chain hydrophobic groups such as are present in the conventionally used soaps. yet another type of polymerized material, for used in latex preparation, are certain alkyl sulfide terminated oligomers as described by U.S. Pat. No. 3,498,943. These materials differ from the surfactants contemplated by the present invention in that they rely primarily on the hydrophobic thioalkyl end groups for adsorption into the disperse phase of the latex. Such materials are polymeric analogs of conventional soaps having a hydrophilic head and hydrophobic tail and are not representative of the present polyelectrolytes wherein the hydrophobic units are randomly distributed in the backbone of the polyelectrolyte and wherein such polyelectrolyte is adsorbed in the disperse phase of a dispersion in a substantially flat configuration which provides a high adsorption efficiency which, in turn, results in highly desirable properties in a variety of applications.

SUMMARY OF THE INVENTION

The novel dispersions of the present invention contain interpolymeric interfacially spreading polyelectrolytes which provide for a high degree of adsorption efficiency for a wide variety of disperse phase materials. These polyelectrolytes are defined as being substantially linear water-soluble or water-dispersible interpolymeric materials composed of a mixture of ionic hydrophilic and nonionic hydrophobic units wherein the hydrophobic units are randomly distributed in the backbone of the polyelectrolyte and wherein the polyelectrolyte is further characterized by having an adsorption constant equal to or greater than 1 when in a heterogeneous system comprising a disperse phase and a continuous phase, at the point where the disperse phase is saturated with the polyelectrolyte. The adsorption constant is determined as the amount of polyelectrolyte in the disperse phase divided by the amount of polyelectrolyte in the continuous phase. The polyelectrolytes contemplated herein are further characterized as being adsorbed onto the disperse phase in a substantially flat configuration, i.e., without substantial extension into the continuous phase, and wherein the area occupied by each hydrophilic unit of such polyelectrolyte at the saturated disperse phase surface is from about 60 to 100 square Angstrom units.

DESCRIPTION OF THE PREFERRED EMBODIMENTS

The interpolymeric interfacially spreading polyelectrolytes contemplated for use by the present invention have an essentially random structure and relatively narrow composition distribution. The composition must be narrow enough that the interpolymers at one end of the range do not differ substantially in properties or become incompatible with interpolymers at the other end of the range. The batch polymerization of vinyl monomers normally leads to a broad composition distribution when carried out to high conversion because of the unequal reactivities of the various monomers. Batch reactions to high conversion can be used only when the reactivity ratios, $r_1$ and $r_2$ of the respective monomers are near unity. Interpolymers of monomers with widely differing reactivity can be prepared by limiting batch reactions to low conversion, i.e., less than about 50 percent conversion. (The exact allowable conversion depends on $r_1$ and $r_2$.) One method is to make the interpolymer in a process which generates a constant composition or narrow composition distribution. This includes continuous polymerization where the monomers are passed through a pipe reactor. The polymer is recovered, and unused monomer recycled and replenished with the more reactive component to maintain constant composition.

The preferred method is to produce the polymers in a continuous monomer addition (also known as semicontinuous) solution polymerization process. In this case, the ingredients are metered into the reactor such that the rate of monomer addition controls the rate of polymerization. Under these conditions, monomer is consumed as fast as it enters the reactor thereby eliminating monomer build-up and composition drift and the polymer formed has the same composition as the feed.

Since in many cases, the hydrophilic and hydrophobic monomers are incompatible either alone or in common solvents, the first requirement is to select a compatibilizing reaction medium. Those solvents which are substantially soluble both in water and in hydrocarbon media are satisfactory for this purpose. Exemplary of the solvents which may be used are: methanol, dioxane, dimethyl formamide, N-methyl-2-pyrrolidone, dimethyl acetamide, dimethylsulfoxide, tetramethylene sulfone, n-acetyl piperidine 1,2-dimethoxyethane, and a variety of glycol monoethers including: ethylene glycol phenyl ether, ethylene glycol methyl ether, ethylene glycol ethyl ether, ethylene glycol n-butyl ether, diethylene glycol methyl ether, diethylene glycol ethyl ether, diethylene glycol n-butyl ether, propylene glycol methyl ether, dipropylene glycol methyl ether, tripropylene glycol methyl ether and mixtures of the above. The glycol monoethers and dioxane are preferred by reason of ease of recovery of the resulting polymer. Hydrophilic monomers which may be handled by use of such solvents include particularly, highly ionized monomers such as 2-sulfoethylmethacrylate and 2-acrylamido-2-methyl propane sulfonic acid and relatively hydrophilic nonionic monomers such as acrylamide.

An alternative approach to making the interpolymeric polyelectrolytes used in the present invention is to prepare a hydrophobic interpolymer containing reactive units which can later be converted to ionic units. The hydrophobic polymers are more readily prepared because of the compatibility of the components. Monomers and polymers being of similar polarity normally do not require the presence of a compatibilizing component. Illustrative of reactions which can be carried out on functionally substituted polymers to yield hydrophilic units are the following: displacement reaction on dimethyl aminoethylmethacrylate units to yield quaternary ammonium groups; hydrolysis of methyl acrylate units to acrylic acid; esterification of acids, acid chlorides or anhydrides to yield sulfoesters such as the reaction of methacrylyl chloride units with isothiamic acid to 2-sulfoethyl methacrylate; neutralization of amine or carboxyl groups to yield salts such as methacrylic acid to sodium methacrylate units and the like. Such post reactions also allow the preparation of copolymerized units which cannot be isolated in the monomeric state.

A wide variety of nonionic hydrophobic monomers may be used, depending on the number and kind of ionic groups present in the surfactant molecule. These nonionic units may be defined as any copolymerized ethylenically unsaturated monomer which when in the form of a homopolymer is less than about 0.1 percent soluble in water and wherein such monomer has no substituent extending more than about 10A from the point of ethylenic unsaturation. The following are exemplary of preferred materials: acrylonitrile, methacrylonitrile, methyl acrylate, methyl methacrylate, n-butyl methacrylate, butyl acrylate, hexyl acrylate, dibutyl maleate, styrene, vinyl toluene, vinyl chloride, vinyl acetate, vinyl propionate, ethyl vinyl ether, butyl vinyl ether and t-butyl styrene.

Similarly, a wide variety of ionic monomers may be employed including both positively and negatively charged species containing the radicals $-SO_3^-$, $-OSO_3^-$, $-COO^-$, $-OPO_3^-$-$^+NH_3$, $-^+NR_3$, and the like. These may be defined as being any ethylenically unsaturated ionic monomeric unit (i.e., repeat unit in the polymer chain) which when in the form of a homopolymer is water soluble. This includes: 2-sulfoethyl methacrylate sodium vinyl sulfonate, 2-hydroxy-3-sulfopropyl methacrylate, 2-acrylamido-2-methyl propane sulfonic acid, sodium styrene sulfonate salts of weak vinyl acids such as acrylic, methacrylic, maleic, fumaric, and itaconic acid, vinyl substituted quaternary ammonium salts such as trimethyl aminoethyl methacrylate, 2-hydroxy-3-trimethyl aminopropyl methacrylate, salts of unsaturated amines such as aminoethyl methacrylate HCl and dimethyl aminoethyl methacrylate HCl.

The selection of counter ion is not critical. The counter ions must be water soluble and not destabilize the emulsion. Therefore, multivalent or very hydrophobic ions are undesirable. $H^+$, $NH_4^+$, and alkali metal ions are preferred for acids. $F^-$, $Cl^-$, $Br^-$, $OH^-$, $NO_3^-$, $CH_3COO^-$ are preferred for bases.

The selection of the monomers listed above will depend upon the suspending application. By way of illustration, if one is preparing a water-in-oil emulsion (or conversely an oil-in-water emulsion) the monomers must be selected so that the polyelectrolyte has adequate solubility in the continuous phase. Generally, good results are obtained where the ratio of nonionic hydrophobic units to ionic hydrophilic units is such that the interpolymeric polyelectrolytes have borderline solubility in the continuous phase at the concentration required to just cover the surface of the dispersed phase (a mono-layer). The polyelectrolyte present in the continuous phase may be in the form of micelles or even suspended as particles close to colloidal size (50–100A)and may be cationic or anionic in nature. The disperse phase of the dispersion of the present invention is defined as a liquid or solid material which is substantially insoluble in the continuous phase, having particle dimensions from about 200A to about 50 microns and which require a dispersing aid to form a stable dispersion.

Surface activity in a given polymer is determined primarily by charge density. The polymers containing ionic groups which are strong acids or bases or salts thereof remain essentially completely ionized over the entire pH range 0–14. The polymers containing weak acid or base groups of their derived salts are ionized to varying degrees dependent on pH. Therefore, the change density of such polyelectrolyte is pH dependent.

Especially preferred polyelectrolytes are those whose surface activity is relatively independent of pH. These include the class of polymers wherein the ionic substituent of the hydrophilic unit is a strong acid or base or a salt derived therefrom. Especially preferred are the polymers containing sulfoethyl ester groups and the trialkyl aminoalkyl ester groups.

The continuous phase of the contemplated dispersions is defined as a liquid which is a nonsolvent for the dispersed phase and is chemically inert with regard to the surfactant used.

As discussed previously, the polyelectrolyte molecules are adsorbed into the disperse phase preferentially in a flat configuration without substantial extension into the continuous phase, wherein the area occupied by each hydrophilic group unit of the polyelectrolyte at the saturated disperse phase is from about 60 to 100 square Angstrom units. This means that the number of molecules which can be packed onto the surface of the disperse phase is inversely proportional to the first power of the molecular weight of the polyelectrolyte. Adsorption experiments indicate that flat configuration may be obtained for polyelectrolyte molecular weights as high as about 100,000. However, in many applications were fast kinetics of adsorption is important, such as emulsion and suspension polymerization, much lower molecular weights are preferred, for example, molecular weights of from about 5,000 to 10,000. An optimum molecular weight must then be sought which will be low enough to support the polymerization reaction, yet high enough to provide a distribution constant greater than one when adsorbed onto the disperse phase in a substantially flat configuration.

Other variables for election of an "optimum" polyelectrolyte for a particular application include a consideration of the charge to mass ratio (charge density) in the interpolymer chain, e.g., as the number of charges on a molecule increases, such molecule tends to change from an oil-soluble to a water-soluble material. In between lies a region in which the polyelectrolyte is dispersible or partially soluble in water and exhibits surface activity. Molecules with a sufficiently high charge are water soluble regardless of molecular weight and molecules with a very low charge to mass ratio do not form stable dispersions in water. Generally, polyelectrolytes having a charge density of from about 1 to 4 meq./gram are preferred.

The charge density required to render the interpolymer surface active depends strongly on the polarity of the hydrophobic sequences, e.g., sequences made up of relatively polar units like acrylonitrile require less charge to achieve optimum surface activity in an aqueous dispersion. On the other hand, a polymer containing non-polar sequences like styrene will require proportionately more ionic (or hydrophilic) units to achieve the same level of activity. In some cases, it is advantageous to employ small amounts of very hydrophilic but nonionic comonomers for control of the surface activity and water solubility of the interpolymeric polyelectrolyte without having to use more of the ionic comonomers. Acrylamide, methacrylamide, hydroxy ethyl acrylate and hydroxy propyl acrylate are particularly useful for this purpose.

The nature of the hydrophobic sequences is important also because it influences the extent of adsorption by interacting with the surface of the dispersed phase. An interpolymer with nonpolar sequences adsorbs better on a nonpolar surface. Interpolymers with more polar hydrophobic sequences are necessary to get optimum adsorption on a polar substrate.

Another important factor is the flexibility of the interpolymer chain. When adsorbed, it must be able to spread at the interface to be effective in this application. Chain flexibility is determined in part by interaction of the interpolymer with the continuous phase but mainly by its chemical composition and structure. Polymers with rigid chains have high glass transition temperatures and low solubility and are unsuitable for the present invention. Cellulosic derivatives are illustrative of this class. Preferred are polymers with flexible chain backbones. Exemplary of this class are the random copolymers of ethylenically unsaturated monomers which have a simple carbon chain backbone.

As referred to previously, the polyelectrolyte molecule may adsorb in two extreme ways, i.e., is may lie substantially flat on the surface of the dispersed phase making many contacts with such surface and with substantially no extension into the continuous phase. In such instance, the maximum amount of polymer which may be adsorbed to form a mono-layer on the disperse phase is given by the relation $A=KM$ where A is the maximum adsorption in grams of surfactant per $Cm^2$, M is the molecular weight and K is a constant. The exponent of M is O in the case of flat adsorption. At the other extreme, a polyelectrolyte may attach itself to a dispersed phase by one contact only with the remainder of the surfactant molecule extending into the continuous phase. In this instance, M is one or $A=KM^1$.

The amount of polyelectrolyte adsorbed on the disperse phase may be measured by ion-exchange to remove residual ionic material. The latex is then mixed with varying amounts of polyelectrolyte and allowed to equilibrate for a period of about three days, after which the latex is separated from its serum via centrifugation or ultrafiltration. The serum is analyzed for polyelectrolyte. From this data the adsorption isotherm may be constructed and the maximum amount of polyelectrolyte which will adsorb is determined (surface saturation).

The extension or thickness of the adsorbed layer may be determined directly using viscometry. The viscosity of the above latex formulated with the polyelectrolyte is measured at 0.1 percent solids. From the specific viscosity, one may calculate an increase in the particle size due to an adsorbed layer. Substantially flat configurations provide values of about 10 to 13A at the point of surface saturation.

The dispersions of the present invention are prepared by conventional techniques known to those skilled in the colloid arts. By way of example, the interpolymers may be added to the phase to be dispersed followed by slow addition of the continuous phase until the inversion point is reached. Alternatively, the dispersed phase may be emulsified directly by addition to a stirred solution of the interpolymeric polyelectrolyte in the continuous phase, or the interpolymeric polyelectrolyte may be added to an existing emulsion already stabilized with a conventional surfactant in order to provide increased stability. The interpolymeric polyelectrolyte may also be used directly in a polymerization recipe to effect the formation of a latex or dispersion.

The following nonlimiting examples, wherein all parts and percentages are by weight, will serve to illustrate such uses and the concepts of the present invention:

EXAMPLE 1

Preparation of An Anionic Interpolymeric Interfacially Spreading Polyelectrolyte from Acrylonitrile and 2-Sulfoethyl Methacrylate using a Homogeneous, Continuous Monomer Addition Polymerization in Dimethyl Formamide Varying amounts of acrylonitrile (VCN) and 2-sulfoethyl methacrylate (SEM) were added to about 600 grams of dimethyl formamide (DMF) and heated to a temperature of about 60°C. Thereafter, 1.5 grams (1% based on monomer weight) of the catalyst azobisisobutyronitrile (VAZO) was added. The mixture was then added continuously into a polymerization reactor at a rate of about 33.5 ml./hr. (36 g.). A second stream consisting of a catalyst solution containing 4.3% VAZO by weight in DMF was added at a rate of 16.7 ml./hr. (0.68 g. VAZO). Addition was continued at the above rates over a continuous period of from about 8 to 30 hours. The reactor was then removed from the constant temperature bath and the contents precipitated in isopropanol until a white granular product was obtained. Following precipitation, the polymer was dissolved in a large quantity of deionized water, filtered through a double extra fine varnish screen into flasks, frozen at −78°C., and subsequently subjected to a vacuum of 0.1 mm. Hg. at room temperature. Periodic sampling and subsequent solids determination of the samples obtained indicated a polymerization rate of about 22 to 26 percent per hour.

The following Table I sets forth the amounts of materials used, specific reaction conditions employed and molecular weights of the products obtained. $M_n$ represents the number average molecular weight.

Polymerization was carried out in a tumbling bath at 12 rpm for 17.5 hours at 61°C. Examination of the product in a light microscope showed the presence of microspheres in the range of 3 to 18 micron diameter. The polyelectrolyte was also found to be virtually 100 percent adsorbed on the polymeric disperse phase and in a substantially flat configuration.

EXAMPLE 3

Preparation of an Anionic Interpolymeric Interfacially Spreading Polyelectrolyte from Methyl Methacrylate and 2-Sulfoethyl Methacrylate using a Homogeneous, Continuous Monomer Addition Polymerization in a Glycol Monoether Varying amounts of methyl methacrylate and 2-sulfoethyl methacrylate were polymerized using a homogeneous, continuous monomer addition, solution polymerization procedure as substantially set forth in Example 1 using as a solvent one of a series of glycol monoethers in the presence, in some instances, of small amounts of conventional chain transfer agents. The

TABLE I

| Sample No. | Monomer Ratio Charged (1) | Addition Time (hrs.) | Polymerized Monomer Ratio | $M_n$ | Charge Density (MEQ of Charge/Gms. of Polymer) |
|---|---|---|---|---|---|
|  | VCN/SEM |  | VCN/SEM |  |  |
| 1 | 2/1 | 8.5 | 2.245 | 27200 | 3.20 |
| 2 | 2/1 | 20.75 | 1.98 | 17300 | 3.35 |
| 3 | 2/1 | 7.75 | 1.61 | 18500 | 3.58 |
| 4 | 2/1 | 20 | 1.42 | 17200 | 3.72 |
| 5 | 2/1 | 20 | 2.141 | 21600 | 3.26 |

(1)0.1 mole LiBr added to initial mixture of monomers to reduce viscosity.

EXAMPLE 2

Preparation of Microspheres using a Preformed Anionic Interpolymeric Interfacially Spreading Polyelectrolyte of Example 1

A first phase consisting of 75 grams of monomeric vinylidene chloride, 25 grams acrylonitrile, 0.3 gram divinyl benzene and 0.5 gram azobis-isobutyronitrile dispersed in 11.1 grams of n-hexane, was mixed with a separately prepared second phase consisting of 1.41 grams of an interpolymeric polyelectrolyte identified as Sample No. 2 in Example 1, 0.3 gram of $K_2Cr_2O_7$ and 2.0 grams of NaCl, dissolved in 122 grams of water. The resulting emulsion was placed in a clean citrate bottle, purged with nitrogen for 1.5 minutes and then sealed with a cap lined with polytetrafluoroethylene.

following Table II sets forth the amounts of monomers used, the solvents employed, the specific reaction conditions used and the molecular weight characteristics of the products obtained. The utilization of the referred to glycol monoether solvents resulted in no significant evidence of undesirable ester interchange during the polymerization reaction and the recovery of the polyelectrolyte from the reaction solvent was simplified, i.e., did not require a viscosity controlling agent, as set forth in Example 1.

TABLE II

| Sample No. | Charged Monomer Ratio MMA/SEM | Polymer Monomer Ratio | Solvent | Transfer Agent | Temp. | $M_n$ | Charge Density (MEQ of Charge/Gms. of Polymer) |
|---|---|---|---|---|---|---|---|
| 6 | 6/1 | 5.67/1 | EGME(1) | — | 60°C. | 16,300 | 1.31 |
| 7 | 6/1 | 6/1 | 50 EGME<br>50 Benzene | — | 60°C. | 18,300 | 1.26 |
| 8 | 6/1 | 6/1 | EGME | CCl₄ 5cc | 60°C. | 14,800 | 1.26 |
| 9 | 6/1 | 6/1 | 50 EGME<br>50 Benzene | CCl₄ 5cc | 60°C. | 18,900 | 1.26 |
| 10 | 6/1 | 6/1 | 50 EGME<br>50 Benzene | CCl₄ 5cc | 75°C. | 11,800 | 1.26 |
| 11 | 6/1 | 6/1 | PGME(2) | — | 75°C. | 13,600 | 1.26 |
| 12 | 4/1 | 4/1 | PGME | — | 85°C. | 11,500 | 1.26 |
| 13 | 4/1 | 2.9/1 | PGME | — | 82°C. | 7,700 | 2.07 |
| 14 | 4/1 | — | PGME | — | 87–88°C. | 5,400 | — |

(1)Ethylene glycol methyl ether.
(2)Propylene glycol methyl ether.

EXAMPLE 4

Preparation of Polymeric Latex Using a Preformed Interpolymeric Anionic Interfacially Spreading Polyelectrolyte of Example 3

Into a polymerization vessel was charged a mixture of 500 grams of deionized water (adjusted to pH value of 3.5 to 4.0 with hydrochloric acid) and 2.5 grams of sodium lauryl sulfate. To this mixture was subsequently added an initial monomer charge comprising 25 grams of a mixture of monomeric vinylidene chloride (12.5 grams) and acrylonitrile (12.5 grams).

The reaction mixture was then stirred under nitrogen for several minutes at a temperature of 25°C., and a solution comprising 2.7 grams of sodium sulfoxylate formaldehyde dissolved in about 500 grams of deionized water was thereafter continuously added to the reaction mixture until polymerization of the initial charge of monomers was completed. Following completion of polymerization of the initial charge of monomeric materials, a second monomeric mixture comprising 1840 grams of vinylidene chloride, 160 grams acrylonitrile along with 2 grams of t-butyl hydroperoxide were continuously added to the polymerization vessel with stirring at a rate of about 1100 grams over a 20-hour period. Over the same period of time a solution, prepared by dissolving the intepolymeric polyelectrolyte identified as Sample No. 9 in Example 2 in an amount sufficient to provide about 1.5 percent by weight of polyelectrolyte based on latex polymer solids in 600 grams of water, was separately added to the polymerization vessel at a rate of 300 grams of solution over a 20-hour period and adjusted to 0.01 molar with NaCl. Following the addition of the polymerizable material, a solution of sulfoxylated formaldehyde (as described previously) was again added over a two-hour period along with 0.85 grams of t-butyl hydroperoxide, to allow completion of polymerization of the monomeric ingredients. The resulting polymerization product was a highly stable, low foaming, aqueous colloidal polymer dispersion containing approximately 48 to 50 percent polymer solids and having less than about 1 weight percent of coagulum present therein. The polyelectrolyte was found to be virtually 100 percent adsorbed on the polymeric disperse phase of the latex and in a substantially flat configuration.

EXAMPLE 5

Preparation of an Anionic Interpolymeric Interfacially Spreading Polyelectrolyte from Methyl Methacrylate and 2-Sulfoethyl Methacrylate using a Homogeneous, Continuous Monomer Addition Polymerization in Dioxane Methyl methacrylate (100 g.) and 2-sulfoethyl methacrylate (32.4 g.) were dissolved in 529.6 g. of dioxane and placed in a five-liter multineck flask immersed in an oil bath heated to 87°C. The flask was equipped with a nitrogen sparge, thermometer well, two feed stream ports, stirrer and condenser. The monomer feed stream was composed of 525 g. of methyl methacrylate and 170.1 g. of 2-sulfoethyl methacrylate as well as 17.4 g. of carbon tetrachloride. The catalyst feed stream was composed of 2780.4 g. of dioxane and 13.9 g. of VAZO (azo-bis(isobutyronitrile)). Monomer was fed into the reaction at a rate of 39.7 g./hr. by means of a metering pump. Catalyst was fed into the reaction at a rate of 158.8 g./hr. to maintain a concentration of 20% within the flask. The catalyst concentration was 2% based on monomers.

After all of the monomers and catalyst had been added the reaction flask was kept in the heated bath for several hours to insure complete reaction.

The polymer was isolated as follows: The solution was poured into two liter freeze dry flasks, each flask about half full. Vacuum was applied and after about 5–10 minutes the contents of the flask became solid. Vacuum was continued until all dioxane had been removed as indicated by lack of condensed water or frost on the outside of the flask. The contents of the flask at this time were a light tan solid.

The polymer was then dissolved in water and the aqueous solution was frozen in a −78°C. bath and the flask placed on a high vacuum apparatus. A white, fluffy polymer was obtained after all of the water had been removed. Molecular weight determination by means of a gel permeation chromatography and viscosity measurements indicate a number average molecular weight of about 3100.

The use of dioxane as a solvent provided the greatest ease of polymer recovery, as contrasted to the dimethylformamide of Example 1 and the glycol monoether solvents of Example 3, due to its capability of forming a rich azeotrope with water and by its higher freezing point which makes the recovery of the surfactant by freeze drying much easier. It was further discovered that the presence of normal amounts of p-dioxyanyl hydroperoxide in the dioxane, in combination with the usual VAZO catalyst, resulted in interpolymeric polyelectrolytes of noticeably lowered molecular weight, which polyelectrolytes were very efficient in latex particle coverage.

EXAMPLE 6

Preparation of a Seed Latex using the Preformed Anionic Interpolymeric Interfacially Spreading Polyelectrolyte of Example 5

The following ingredients were charged to a polymerization vessel:

| | (Grams) |
|---|---|
| Deionized Water | 420 |
| Interpolymeric Polyelectrolyte | 140 |
| Styrene Monomer | 140 |
| T-butyl Hydroperoxide | 0.5 |
| 1.7% Sodium Formaldehyde Hydrosulfite Solution in Water | 5 |

The resulting seed latex was characterized by containing about 38 percent of solid, individual particles having a size of about 332A as determined by electron microscopy.

A two percent solution of the seed latex (100 grams) was titrated with a 10 percent solution of calcium chloride. No visible flocculation occurred following the addition of up to 50 ml. of the calcium chloride solution. The latex was classified as having excellent electrolyte stability.

As a means of determining the shear stability of the seed latex, a 1 percent dispersion of the latex in a 10 percent tetrahydrofuran/90 percent water solution was sheared for 10 minutes in a Waring Blendor. The increase in optical absorbency at 546 millimicrons was used as the measure of agglomeration. The solution exhibited an increase in optical absorbency of 0.535A and was considered to have excellent shear stability.

EXAMPLE 7

Preparation of an Anionic Interpolymeric Interfacially Spreading Polyelectrolyte from T-butyl Styrene and 2-Sulfoethyl Methacrylate Utilizing the homogeneous, continuous monomer addition, solution polymerization procedure as substantially set forth in Example I, an interpolymeric polyelectrolyte comprised of t-butyl styrene and 2-sulfoethyl methacrylate, in a ratio of 1 mole of t-butyl styrene and 5 moles of 2-sulfoethyl methacrylate, was prepared. Water in xylene and water in ethyl benzene emulsions were prepared utilizing such polyelectrolytes in an amount of about 1.5 to 2 percent by weight. The oils remained in the continuous phase even at the very high phase ratio of water to oil.

EXAMPLE 8

Preparation of an Anionic Interpolymeric Interfacially Spreading Polyelectrolyte from Methyl Methacrylate and 2-Acrylamido-2-Methyl Propane Sulfonic Acid Utilizing the homogeneous, continuous monomer addition, solution polymerization procedure as substantially set forth in Example 1, an interpolymeric polyelectrolyte comprised of methyl methacrylate (MMA) and 2-acrylamido-2-methylpropane sulfonic acid (AMPS), in a ratio of 6 moles of MMA and 1 mole of AMPS, was prepared using methanol as the solvent.

Polystyrene latexes were prepared in a stirred reactor using the anionic polyelectrolyte as the sole emulsifier. The recipe is listed below:
  167 grams styrene
  185 grams deionized water
  1 gram formopon
  10 grams anionic polyelectrolyte The reaction was stirred under nitrogen and heated to 90°C. at which time 1 ml. of tertiary butyl hydroperoxide (TBHP) was added. The reaction was then continued for 4 hours at 90°C., then cooled to about 25°C. and filtered. The polymeric latex was substantially free from coagulation.

A styrene-butyl acrylate copolymer latex was also prepared using the anionic polyelectrolyte as the sole emulsifier. The recipe is listed below:
  83.5 grams styrene
  83.5 grams butyl acrylate
  135 grams water
  gram formopon
  60 grams anionic polyelectrolyte The reaction was stirred under nitrogen and heated to 90°C. at which time 1 ml. of TBHP was added. The reaction was then continued for 4 hours at 90°C., then cooled and filtered. The polymer latex was substantially free of coagulum.

EXAMPLE 9

Preparation of Cationic Interfacially Spreading Polyelectrolytes

Cationic interfacially spreading polyelectrolytes containing trimethylaminoethyl methacrylate units was prepared by batch polymerization in solution using N,N-dimethyl aminoethyl methacrylate (DMAEM) as the functional monomer. The recipe is given below:
  50 parts DMAEM
  50 parts n-butyl acrylate
  1 part mercaptoethanol
  1 part azobisisobutyronitrile
  100 parts dioxane The reaction was carried out under $N_2$ at 50°C. for 6 hours. The polymer was recovered by precipitating in cold hexane. Polymer yield was 67%. The amine polymer was quaternized by the following procedure: The polymer was redissolved in tetrahydrofuran (THF) to form a 50% solution. To this was added 2.5 meq. iodomethane per gram of polymer. The reaction mixture was diluted with approximately equal volume of $H_2O$ and stirred for 48 hours. The mixture was stripped to remove THF and ion exchanged from iodide to chloride. The product was recovered as a low viscosity aqueous solution containing 11.9% solids and 2.46 meq. chloride per gram of polymer.

A DMAEM/styrene copolymer was prepared in essentially the same recipe. Polymer yield was 37.2%. The quaternized polymer was recovered as a 9.37% aqueous solution containing 4.18 meq. $Cl^-$ per gram of polymer.

The polyelectrolytes were characterized by adsorption onto a standard polystyrene latex. They were found to adsorb in an essentially flat configuration with distribution coefficients of 2.59 for the butyl acrylate copolymer and 3.67 for the styrene copolymer.

Polystyrene latexes were prepared in a stirred reactor using the cationic trimethylaminoethyl substituted polyelectrolytes as the sole emulsifier. The recipe is listed below:
  50 parts styrene
  100 parts deionized $H_2O$
  0.5 part azobisisobutyronitrile
  X parts polyelectrolyte
  Y parts $NH_4Cl$ The reaction was carried out under $N_2$ at 60°C. for 18 hours. In every case, a fluid, stable latex was obtained. The results are tabulated below:

TABLE III

| Polyelectrolyte Type | PE Amount X | Salt Y | Latex Yield % | Particle Size A (By L.S.) |
|---|---|---|---|---|
| TMAEM/BA | 1 | 0 | 76 | 955 |
| TMAEM/BA | 2 | 0 | 92 | 845 |
| TMAEM/BA | 2 | 0.067 | 54 | 1580 |
| TMAEM/BA | 2 | 0.134 | 52 | 1550 |
| TMAEM/BA | 10 | 0 | 88 | 885 |
| TMAEM/Sty. | 2 | 0.134 | 88 | 1650 |
| TMAEM/Sty. | 10 | 0 | 94 | 1810 |

What is claimed is:

1. A colloidal dispersion containing as the surfactant material a stabilizing amount of a noncopolymerizable substantially linear interpolymeric interfacially spreading polyelectrolyte in both the disperse and continuous phase of said dispersion wherein:
   1. said polyelectrolyte is composed of a mixture of nonionic hydrophobic units and ionic hydrophilic units wherein said nonionic hydrophobic units are copolymerized ethylenically unsaturated monomers which when in the form of amorphous homopolymers are less than about 0.1 percent soluble in water and wherein said monomer has no substituent extending more than about 10 Angstrom units from the point of ethylenic unsaturation said units being randomly distributed in the backbone of said polyelectrolyte and wherein said ionic hydrophilic units are copolymerized ethylenically unsaturated ionic monomers which when in the form of amorphous homopolymers are soluble in water and wherein said ionic hydrophilic units remain substantially completely ionized over the entire pH range of 0 to 14, 2. said polyelectrolyte is adsorbed at said disperse phase in a substantially flat configuration and where the area occupied by each ionic hydrophilic unit of said polyelectrolyte at the disperse phase surface is from about 60 to 100 square Angstrom units per hydrophilic unit, and 3. said polyelectrolyte has an adsorption constant equal to or greater than 1 at the point where the disperse phase is saturated with said polyelectrolyte wherein said adsorption constant is determined as the amount of polyelectrolyte in said disperse phase divided by the amount of polyelectrolyte in said continuous phase.

2. The dispersion of claim 1 wherein said polyelectrolyte is cationic.

3. The dispersion of claim 1 wherein said polyelectrolyte is anionic.

4. The dispersion of claim 2 wherein said ionic hydrophilic units are N-methyldimethylaminoethylmethacrylate and said nonionic hydrophobic units are n-butyl acrylate.

5. The dispersion of claim 3 wherein said ionic hydrophilic units are selected from the group consisting of 2-sulfoethyl methacrylate and 2-acrylamido-2-methyl propane sulfonic acid.

6. The dispersion of claim 5 wherein said nonionic hydrophobic units are selected from the group consisting of acrylonitrile, methyl methacrylate and t-butyl styrene.

7. The dispersion of claim 6 wherein said ionic hydrophilic units are 2-sulfoethyl methacrylate and said nonionic hydrophobic units are acrylonitrile.

8. The dispersion of claim 6 wherein said ionic hydrophilic units are 2-sulfoethyl methacrylate and said nonionic hydrophobic units are methyl methacrylate.

9. The dispersion of claim 6 wherein said ionic hydrophilic units are 2-sulfoethyl methacrylate and said nonionic hydrophobic units are t-butyl styrene.

10. The dispersion of claim 6 wherein said ionic hydrophilic units are 2-acrylamino-2-methylpropane sulfonic acid and said nonionic hydrophobic units are methyl methacrylate.

11. The dispersion of claim 4 wherein said nonionic hydrophilic units are styrene.

* * * * *